United States Patent
Oh

(10) Patent No.: US 9,462,097 B2
(45) Date of Patent: Oct. 4, 2016

(54) MOBILE TERMINAL

(75) Inventor: Han-Gyu Oh, Seoul (KR)

(73) Assignee: LG ELECTRONICS INC., seoul (KR)

( * ) Notice: Subject to any disclaimer, the term of this patent is extended or adjusted under 35 U.S.C. 154(b) by 621 days.

(21) Appl. No.: 12/163,992

(22) Filed: Jun. 27, 2008

(65) Prior Publication Data

US 2009/0122026 A1  May 14, 2009

(30) Foreign Application Priority Data

Nov. 9, 2007 (KR) .................. 10-2007-0114420

(51) Int. Cl.
| | | |
|---|---|---|
| *G06F 3/045* | (2006.01) | |
| *H04M 1/02* | (2006.01) | |
| *G06F 1/16* | (2006.01) | |
| *G06F 3/044* | (2006.01) | |
| *G06F 3/0488* | (2013.01) | |
| *H04M 1/23* | (2006.01) | |

(52) U.S. Cl.
CPC ............ *H04M 1/0266* (2013.01); *G06F 1/169* (2013.01); *G06F 1/1613* (2013.01); *G06F 1/1624* (2013.01); *G06F 1/1643* (2013.01); *G06F 1/1662* (2013.01); *G06F 1/1677* (2013.01); *G06F 3/044* (2013.01); *G06F 3/04886* (2013.01); *H04M 1/23* (2013.01); *H04M 1/0235* (2013.01); *H04M 1/233* (2013.01); *H04M 2250/18* (2013.01); *H04M 2250/22* (2013.01)

(58) Field of Classification Search
CPC ............ H04M 1/0202; H04M 1/0235; H04M 1/0266; H04M 1/23; H04M 1/233; H04M 2250/18; G06F 1/1613; G06F 1/1624; G06F 1/1643; G06F 1/1662; G06F 1/1677; G06F 1/169; G06F 3/044; G06F 3/04886
USPC .......................................................... 345/156
See application file for complete search history.

(56) References Cited

U.S. PATENT DOCUMENTS

| | | | |
|---|---|---|---|
| 4,690,680 A | 9/1987 | Higgins | |
| 6,462,941 B1* | 10/2002 | Hulick et al. ............ | 361/679.24 |
| D467,235 S | 12/2002 | Hawkins et al. | |
| 7,825,907 B2* | 11/2010 | Choo et al. ................... | 345/173 |
| 7,876,274 B2* | 1/2011 | Hobson et al. ............... | 343/702 |
| 2003/0025679 A1* | 2/2003 | Taylor et al. ................. | 345/175 |

(Continued)

FOREIGN PATENT DOCUMENTS

| | | |
|---|---|---|
| CN | 1949425 | 4/2007 |
| EP | 1589407 | 10/2005 |

(Continued)

OTHER PUBLICATIONS

Muhin, I.A., "Touch Screens—Solution of Problems," Journal of Broadcasting—Television and Radio, Part 1, No. 3 (55) May 2006, p. 50-52; Part 2, No. 4 (56) Jul. 2006, p. 40-41; Part 3, No. 7 (59), Nov. 2006, p. 64-66.

*Primary Examiner* — Kumar Patel
*Assistant Examiner* — Insa Sadio
(74) *Attorney, Agent, or Firm* — Lee Hong Degerman Kang & Waimey; Jonathan Kang; Jeffrey Lotspeich

(57) ABSTRACT

A mobile terminal having an input device that performs inputting in a tactile manner is disclosed. A touch screen of a first region and touch buttons of a second region are implemented by a single touch sheet without having touch sensing units. Thus, manufacturing, assembling and handling can be facilitated.

16 Claims, 4 Drawing Sheets

(56) References Cited

U.S. PATENT DOCUMENTS

| | | | |
|---|---|---|---|
| 2005/0179654 A1 | 8/2005 | Hawkins et al. | |
| 2007/0247436 A1* | 10/2007 | Jacobsen | 345/173 |
| 2007/0285913 A1* | 12/2007 | Cybart et al. | 362/24 |
| 2008/0014787 A1* | 1/2008 | Kim et al. | 439/517 |
| 2008/0266269 A1* | 10/2008 | Lee et al. | 345/173 |
| 2012/0094769 A1* | 4/2012 | Nguyen et al. | 463/42 |

FOREIGN PATENT DOCUMENTS

| | | |
|---|---|---|
| EP | 1841185 | 3/2007 |
| JP | 10-039993 | 2/1998 |
| JP | 2002215330 | 8/2002 |
| JP | 2003036132 | 2/2003 |
| JP | 2004-038927 | 2/2004 |
| JP | 2004094389 | 3/2004 |
| KR | 10-2004-0004365 | 1/2004 |
| KR | 10-2004-40004365 | 1/2004 |
| RU | 44399 | 3/2005 |
| WO | WO 2007/012899 | 2/2007 |

\* cited by examiner

MOBILE TERMINAL

CROSS-REFERENCE TO RELATED APPLICATION

Pursuant to 35 U.S.C. §119(a), this application claims the benefit of earlier filing dates and right of priority to Korean Application No. 10-2007-0114420 filed on Nov. 9, 2007, the contents of which are hereby incorporated by reference herein in its entirety.

BACKGROUND

A mobile terminal having an input device that allows various types of tactile user inputs is provided.

A mobile terminal is a device that can be carried around and has one or more functions such as voice and video call communication, inputting and outputting information, storing data, and the like.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions of such multimedia players or devices, the multimedia player requires sufficient support in terms of hardware or software, for which numerous attempts are being made and implemented. For example, a user interface allowing users to easily and conveniently search for and select one or more functions is being developed.

Also, as users consider their mobile terminal to be a personal portable device that may express their personality, mobile terminals with desirable portability and various designs are being developed. For example, the mobile terminal employs a touch screen to make its front surface appear simple and minimize degradation due to user manipulation after prolonged use.

However, upon repeated user manipulation or when a particular function is immediately executed only via the touch screen, the advantages of user input via key manipulation cannot be supported, so a configuration that combines a touch screen and a key input scheme has been proposed. Nevertheless, the key input scheme of a push button still has some drawbacks in that the user interface appears to be too complicated.

SUMMARY

The present inventors recognized certain drawbacks of the related art, as explained above. Upon such recognition, the following concepts and features have been conceived.

A mobile terminal capable of improving an external appearance while supporting both the advantages of a touch screen and a key input scheme is provided herein such that a more user-friendly interface is achieved.

Such mobile terminal comprises: a terminal body having first and second regions; and a touch sheet that senses user contact applied on the first and second regions. The touch sheet may be integrally formed to sense touch inputs of the first and second regions. Accordingly, a touch sensing unit with respect to the first region and another touch sensing unit for the second region are not needed, and thus, the manufacturing, assembling and handling procedures can be improved.

The touch sheet may include a touch screen pattern portion that includes multiple conductive lines to sense user inputs (i.e., finger touching, swiping, tapping, etc.) applied to the first region, and a touch button pattern portion disposed to have a certain area on the second region. The touch screen pattern part may be suitable for a touch screen on which a position of an inputtable item or a menu is displayed at various or different changed locations on the screen, while the touch button pattern part may be suitable for receiving a repeated key inputs. Also, a display module (or other components to support display functions) may be installed at the first region and a circuit board (or other necessary components) may be installed at the second region.

A window may be provided to cover the touch sheet. The window may serve to remove or reduce a complicated border lines or assembly gaps between the first and second regions, thus improving the external appearance.

The touch sheet may include at least one transmissive insulation layer on which the touch screen pattern portion and the touch button pattern portions are formed. The transmissive insulation layer serves as a base layer to configure the patterned touch screen pattern portion and the touch button pattern portion.

The touch screen pattern portion and the touch button pattern portion may include data lines to transmit a signal. In this case, the data lines of the touch screen pattern portion may be aligned along edges of the transmissive insulation layer and may be congregated with the data lines of the touch button pattern portion so as to be connected with an FPCB (Flexible Printed Circuit Board). Because the FPCB is not connected with each of the first and second regions in a separate manner, but collectively connected, the disposition of other components can be more easily facilitated.

A conductive shielding line for shielding the data lines of the touch screen pattern portion may be configured at edges of the first region of the touch sheet. The shielding line prevents the data lines of the touch screen pattern part from being affected by other internal components or by the surface of the mobile terminal. In this case, the shielding line may be positioned on the opposite surface of the insulation layer on which the data lines of the touch screen pattern portion are disposed. The shielding line may be configured to partition the first and second regions.

The transmissive insulation layer may be made of a flexible resin material, and the touch screen pattern portion and the touch button pattern portion may be made of ITO on the transmissive insulation layer and formed by a sputtering process. The touch screen pattern part and the touch button may be simultaneously printed on the transmissive insulation layer. Namely, they can be configured at a single time.

The touch button pattern portion may have multiple unit pattern that are spaced apart each other, and at least one through hole may be formed at a space between the touch button pattern portion. Unlike the touch screen pattern portion that has a latticed structure formed by the multiple lines, the touch button pattern portion is configured in the form of dots with a certain area spaced apart from each other, so through holes may be suitably formed between the touch button pattern portion.

A first push button that receives user push inputs may be mounted through the through hole.

The touch button pattern portion may be disposed around the first push button (e.g., top, bottom, left, right etc.). Each touch button pattern portion may be allocated to allow the user to move a cursor or a point in a certain direction. The first push button can help recognize the position of a key to be touched on the touch screen window.

The terminal body has a lower end portion that may have a round shape, and two or three second push buttons that perform inputting in the push manner may be disposed at the lower end portion. The second push button enhances usability of the touch screen pattern portion and the touch button pattern portion that perform inputting in a tactile manner together with the first push button.

The terminal body may include a first terminal body and a second terminal body that is connected to be slidably movable with respect to the first terminal body, and the first and second regions and the touch sheet may be formed on the first terminal body. The mobile terminal may be applicable to different types of mobile terminal, for example, a bar type or a folder type mobile terminal. The second terminal body may include a keypad for inputting numbers or characters.

An illumination unit for illuminating the first region may be provided at an upper portion of the circuit board. In this case, the illumination unit may be formed of an EL sheet that performs surface illumination to acquire an illumination effect of the first region on which touch inputs are made.

DETAILED DESCRIPTION

An exemplary mobile terminal related to the present invention will now be described in detail with reference to the accompanying drawings.

Figure 1:
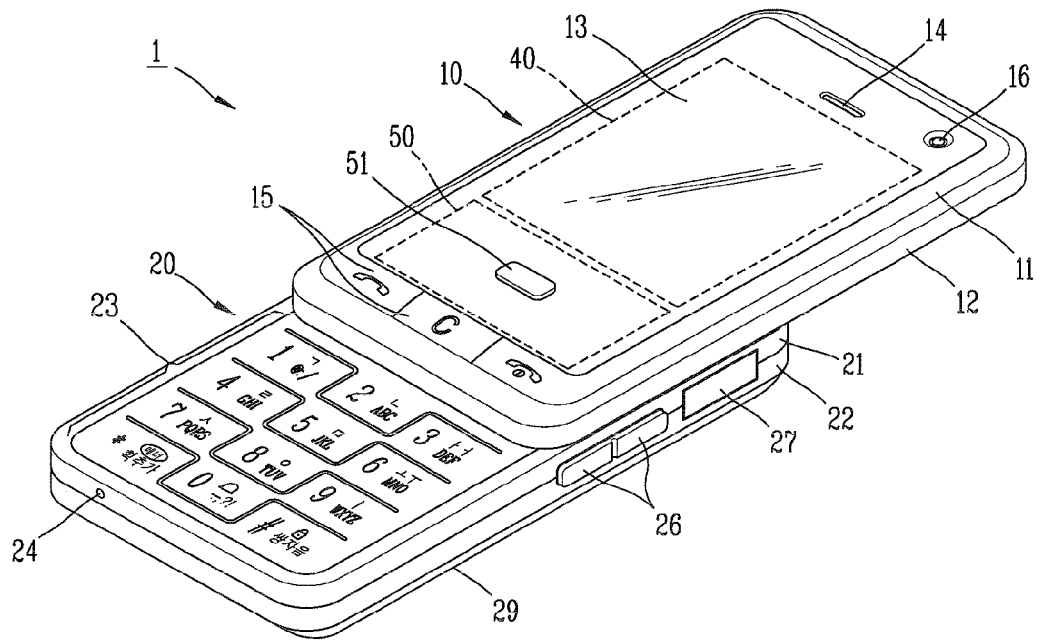
FIG. 1 is a front perspective view of a mobile terminal related to the present invention.

FIG. 1 is a front perspective view of a mobile terminal related to the present invention. As shown in FIG. 1, the mobile terminal 1 includes a first terminal body 10 and a second terminal body 20 that may be configured to be slidably moved along at least one direction with respect to the first terminal body 10.

A state in which the first terminal body 10 is disposed to overlap with the second terminal body 20 may be called a closed configuration, and as shown in FIG. 1, a state in which the first terminal body 10 exposes at least a portion of the second terminal body 20 may be called an open configuration.

The mobile terminal 1 may usually operate in a standby mode in the closed configuration, but this mode can be released by user manipulation. In the open configuration, the mobile terminal may mainly function in a call mode or the like, but may be changed to the standby mode according to user manipulation or after the lapse of a certain time.

A case (housing, casing, cover, etc.) constituting the external appearance of the first terminal body 10 comprises a front case 11 and a rear case 12. Various electronic components may be installed in a space formed by the front case 11 and the case 12.

At least one intermediate case may be additionally disposed between the front case 11 and the rear case 12. The case can be formed by injection-molding a synthetic resin, or made of a metallic material such as stainless steel (STS), titanium (Ti), or the like.

The lower end of the first terminal body 10 may have a round shape, and two or three or more push buttons 15 may be provided at a lower end portion of the front case 11 having the corresponding round shape. The push buttons 15 may be assigned to immediately execute a send key or end key or a power ON/OFF operation or the like, or other particular functions. The push buttons 15 may be formed such that it is at the same or similar level as an outer surface of the front case 11 when not pressed to thus provide a unified image of the mobile terminal 1.

The front surface of the first terminal body 10, excluding the lower push buttons 15, may be covered by a window 13. The window 13 and the inner side of the window 13 comprise a first region 40 for displaying information and a second region 50 for receiving tactile key inputs. Namely, the first region may output visual information according to various modes of the mobile terminal 1 and the second region 50 includes some keys (i.e., buttons, pressable regions, etc.), so when the keys are touched, the second region 50 may execute a corresponding function or perform inputting.

With reference to FIG. 1, the window 13 is integrally formed. Although the surface of the window 13 includes the first region 40 and the second region 50 each having a different function at an inner side thereof, the first region 40 and the second region 50 may have a unified smooth form without any assembly gaps or border lines. Due to its long configuration, such window 13 may be deformed, so it is preferably made of a material such as tempered glass, but other suitable materials may be used.

On or near the window 13, there may be formed an audio output unit 14, a first image input unit 16 and a push button 51 which is disposed at a substantially central portion of the first region 50.

The first image input unit 16 is disposed at an inner side of the window 13 so as not to deform the external appearance of the front surface of the first terminal body 10, and a certain area of the window 13 has transmittance (light transmittance characteristics) to allow light to pass therethrough. The first image input unit 16 may be a camera module (or other image capturing means) for capturing an image or video.

The first audio output unit 14 is disposed within an opening (sound hole) 13b (See FIG. 3) penetratingly formed on the window 13, and to allow various notification sounds or multimedia reproduction sounds, etc., as well as a conversation voice to be output. A plurality of first audio output units 14 may be provided to implement a stereophonic function.

The first region 40 of the window 13 may be formed to be transmissive or translucent to allow a screen image outputted from the display module 41 (See FIG. 3) to be viewed, and the other remaining regions excluding the first region 40 may be formed to be opaque.

The second region 50 of the window 13 may include marks (symbols) for the respective keys. Each mark may be printed (or etched, molded, etc.) on an inner surface of the window 13 in a negative manner, whereby the marks are not clearly seen in a standby state, but when a touch input is detected, the marks can be clearly identified by the lightening of an illumination unit 53 (See FIG. 3) disposed within the window 13. As another example, the marks may be configured as multiple sets whereby different sets of marks can be viewed by means of the illumination unit 53 according to a mode of the mobile terminal 1.

The push button 51 (or other type of pressable element) disposed at the central portion of the second region 50 may have a reference point (or indicator) to recognize the positions of keys arranged in a divided manner. Namely, the other remaining keys, excluding the push button 51, operate in a tactile manner, so it may not be easy to recognize the positions of the keys. The push button 51 may be configured to be protruded with a certain height to allow for an easy recognition, whereby the touch type keys arranged around the push button 51 may be more precisely manipulated by the user.

Like the first terminal body 10, the second terminal body 20 may include a front case 21 and a rear case 22.

A keypad 23 may be configured on a front surface of the second terminal body 20, specifically, on a front case 21, and side keys 26, an audio input unit 24, and an external interface 27 may be configured on at least one of the front case 21 and a rear case 22.

The touch key of the push button 51 of the second region 50, the push buttons 15 at the lower end portion of the first terminal body 10, and the keypad 23 and side keys 26 of the second terminal body 20 may be generally called as a manipulating portion. Besides the manipulating portion, an input unit such as a wheel member, a jog dial, a joystick or the like may be additionally implemented. From the perspective of their functions, the touch key or the push buttons 15 and 51 of the first terminal body 10 are configured to input commands such as start, end and scroll, and the keypad 23 is configured to receive user input numbers, characters, and symbols, etc. The side keys 26 may operate as a so-called hot key (or shortcut key) for performing a special function such as activation of the first image input unit 16.

The audio input unit 24 may be implemented in the form of, for example, a microphone to receive user voice or other sounds.

The external interface 27 may be used as a communication link (passage or path) through which the terminal can exchange data or the like with an external device.

For example, external interface 27 may be implemented as one of a connection port (terminal) for connecting an earphone to the mobile terminal via a fixed or wireless means, a port for short-range communications (e.g., an Infrared Data Association (IrDA) port, a Bluetooth™ port, a wireless LAN port, etc.), power supply ports for providing power to the external device, or the like.

The interface unit 170 may be a card socket (or receiving unit) for accommodating an external card, such as a Subscriber Identity Module (SIM), a User Identity Module (UIM), a memory card for storing information, or the like.

A battery cover 29 may be detachably installed to cover a battery that supplies power to the mobile terminal 1. The battery may be rechargeable so as to be continuously used, and unlike the battery in the present embodiment, a battery may be detachably combined in the form of a pack.

Figure 2:
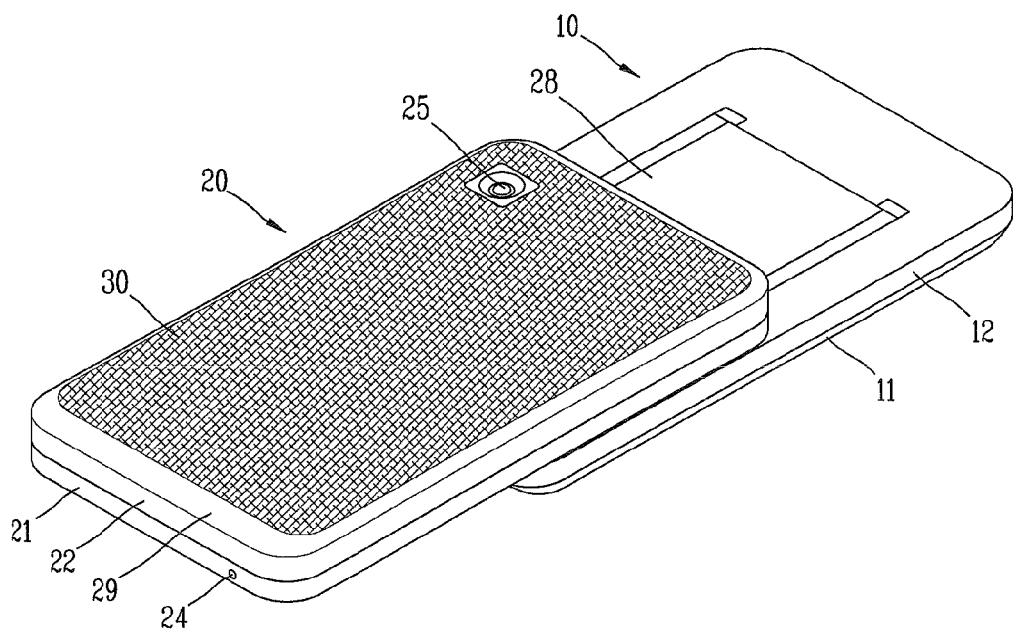
FIG. 2 is a rear perspective view of the mobile terminal in FIG. 1.

FIG. 2 is a rear perspective view of the mobile terminal in FIG. 1. With reference to FIG. 2, a second image input unit 25 may be additionally configured on or near a rear surface of the battery cover 29 or adjacent thereto of the second terminal body 20.

The second image input unit 25 may have an image capture direction which is substantially the opposite to that of the first image input unit 16, and may support a different number of pixels as that of the first image input unit 16. For example, the first image input unit 16 may be used for low resolution (i.e., supporting a relatively small number of pixels) to quickly capture an image (or video) of the user's face and immediately transmit the same to the other party during video conferencing or the like. Meanwhile, the second image input unit 25 may be used for high resolution (i.e., supporting a relatively large number of pixels) in order to capture more detailed (higher quality) images (or video) which typically do not need to be transmitted immediately. A flash or a mirror may be additionally disposed to be adjacent to the second image input unit 25.

A portion of a sliding module 28 that slidably combines the first terminal body 10 and the second terminal body 20 may be disposed on the rear case 12 of the first terminal body 10. The other portion of the slide module 28 may be disposed on the front case 21 of the second terminal body 20 and may not be exposed as shown in FIG. 2.

The battery cover 29 may be configured to cover the entirety of the rear surface of the second terminal body 20, without forming assembly gaps or border lines with other components on the rear surface of the second body 20.

A pattern part 30 may be configured on the rear surface of the battery cover 29 to prevent the mobile terminal 10 from being easily moved with respect to the bottom or a sloped face and separated therefrom. The pattern part 30 may have a geometrical regular pattern such as lattice or comb-like pattern. The pattern part 30 may be configured by coating or injection-molding a resin material on a metal base or by some other appropriate means.

In the above description, the second image input unit 25 and so on are disposed on the second terminal body 20, but such configuration is not meant to be limited. For example, one or more of the elements which are disposed on the battery cover 29 in the above description may be mounted on the first terminal 10, mainly, on the rear case 12. In this case, those elements disposed on the rear case 12 can be protected (or covered) by the second terminal body 20 in the closed configuration. In addition, even if the second image input unit 25 is not provided, the first image input unit 16 may be configured to rotate (or otherwise be moved) to thus allow image capturing in the direction of the second image input unit 25 as well as other directions.

The mobile terminal related to the embodiment of the present invention is not limited to the slide type mobile terminal as illustrated in FIGS. 1 and 2 but may be applicable to various other structures such as a bar type, a folder, a swing type, or the like.

Figure 3:
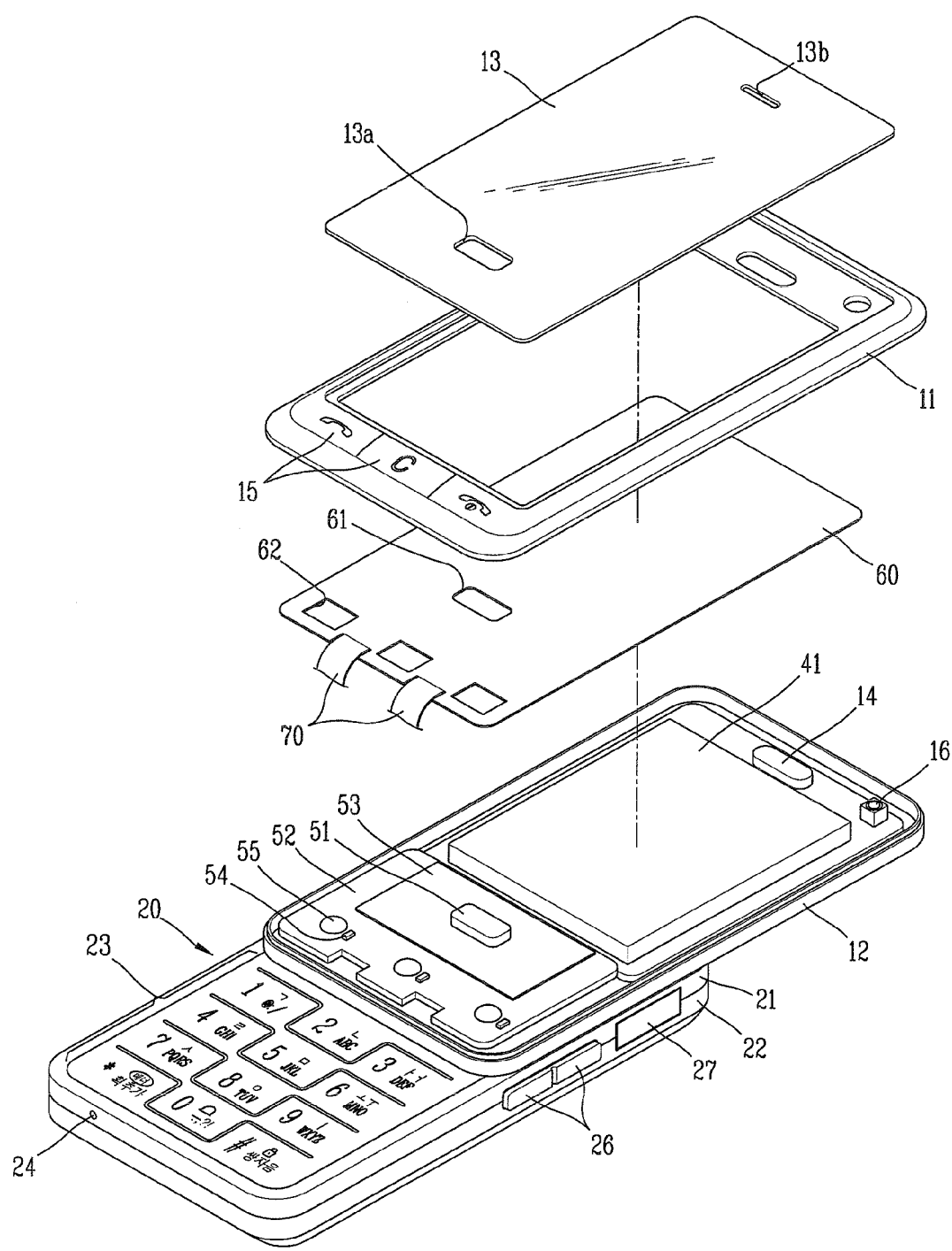
FIG. 3 is an explosive perspective view of the mobile terminal in FIG. 1.

FIG. 3 is an explosive perspective view of the mobile terminal in FIG. 1. As illustrate in FIG. 3, the first terminal body may include the window 13, the front case 11, a touch sheet 60, a display module 41, and a circuit board 52.

A through hole 13*a* (or opening) is formed on the second region 50 of the window 13 to allow the push button 51 as shown in FIG. 1 to pass therethrough, and a through hole 61 (or opening) may be formed on the second region 50 of the touch sheet 60 in a corresponding manner.

Multiple through holes 62 (or openings) may be additionally formed on a lower end portion of the touch sheet 60 to allow the push button 15 to pass therethrough to operate dome switches 55 (or other switch means) formed on the circuit board 52. LEDs 54 (or other illuminating means) may be mounted at one side of the dome switches 55 to illuminate the push buttons 15.

The lower end of the touch sheet 60 may be connected to the circuit board 52 or the first terminal body 10 by a flexible PCB or other appropriate connector.

The push button 51 that receives user inputs in a push manner may be installed to pass through the through hole 61 as described above.

An illumination unit 53 may be installed near or around the push button 51 to illuminate the second region 50. The illumination unit 53 may be configured as a light emitting element such as an electro-luminescent (EL) sheet that provides surface-illumination. The illumination unit 53 may individually illuminate one or more touched keys and implement various illumination effects by differently controlling an illumination time and an illumination area. For example, when the second region 50 is touched, a bright portion may be sequentially moved in a radial direction centering around the touched portion.

Figure 4:
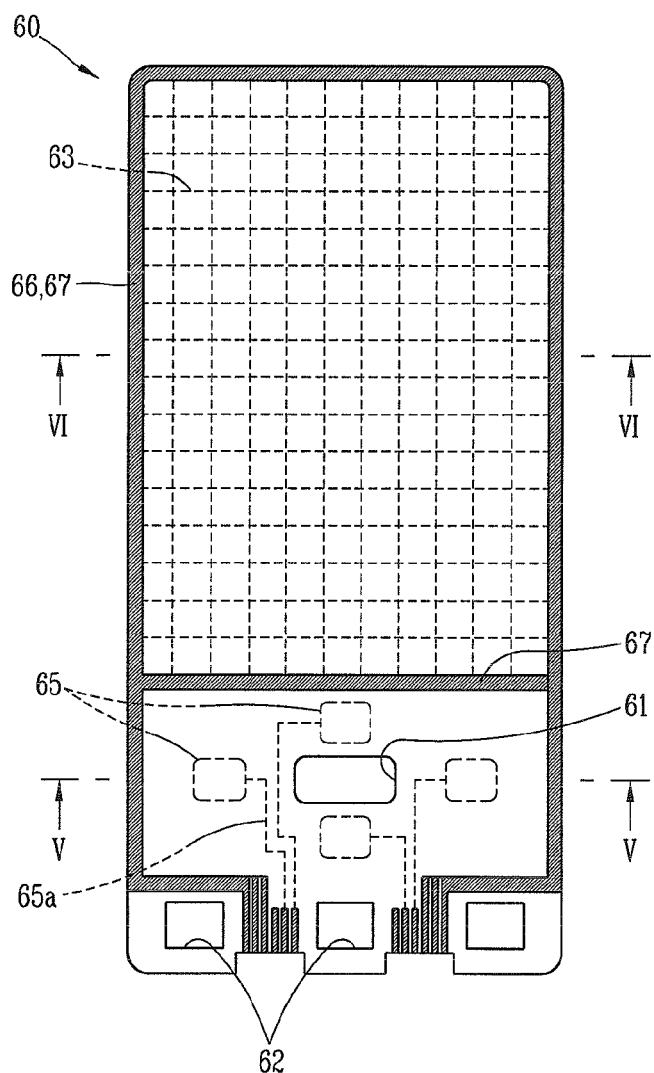
FIG. 4 is a plan view of an exemplary touch sheet.

FIG. 4 is an exemplary plan view of a touch sheet. With reference to FIG. 4, the touch sheet 60 may include a touch screen pattern portion 63 that senses a user touch applied to the first region 40 and a touch button pattern portion 65 that senses a touch applied to the second region 50.

The touch screen pattern portion 63 may include a plurality of conductive lines that are formed in horizontal and vertical directions to detect and calculate a touched position. A data line 66 may be configured on the edges of the touch sheet 60, which are connected with the touch screen pattern portion 63 and used to carry electrical signals. The touch screen pattern portion 63 may have a different pattern, other than the pattern as shown in FIG. 4. For example, a single conductive line may be formed in a zigzag (or matrix) pattern. In this case, because the touch sheet is formed of a single layer, the overall thickness can be reduced.

Compared with the configuration of the touch screen pattern portion 63, the touch button pattern portion 65 may each be disposed with a certain area. As shown in FIG. 4, the touch button pattern portion 65 are disposed at four portions comprising up, down, left, and right portions around the through hole 61. In this case, the touch button pattern part 65 may be allocated to allow the user to move the direction of a cursor or a pointer to facilitate navigation or searching with respect to multiple items outputted by the display module 41. Each touch button pattern part 65 may have multiple key values.

The touch button pattern part 65 are connected by data lines 65a, respectively, and each data line 65a is configured to be connected with a flexible PCB 70 or other control circuits.

Accordingly, when an arbitrary one of the touch button pattern portion 65 is touched, the corresponding touch button pattern portion 65 senses the touch. The touch button pattern portion 65 senses a change in capacitance generated by the touch applied to the window 13 and transmits a corresponding electrical signal. Additionally, constant pressure or resistance detection methods may be implemented for the touch button pattern portion 65.

Unlike the touch screen pattern portion 63, the touch button pattern portion 65 can be spaced apart from each other and the data lines 65a are disposed without being affected by each other, so the spaces (regions) between the touch button pattern portion 65 may be used for a different purpose, such as accommodating through holes 61 or other components. Accordingly, one or more push button 51 may be installed on the front surface of the mobile terminal 1 to allow the user to perform additional inputting in a tactile manner.

With reference to FIG. 4, the data lines 67 of the touch screen pattern part 63 may be arranged along the edges of the touch sheet 60, and the data lines 67 can be connected together with the data lines 65a of the touch button pattern part 65 and the flexible PCB 70 such that the parts connected with the flexible PCB 70 are located at the bottom of the touch sheet 60 (as shown). Accordingly, the flexible PCB 70 is not connected separately to each of the first and second regions 40 and 50 but are connected together at one region, thus not interfering with the configuration of other components and results in improved assembly procedure.

Figure 5:
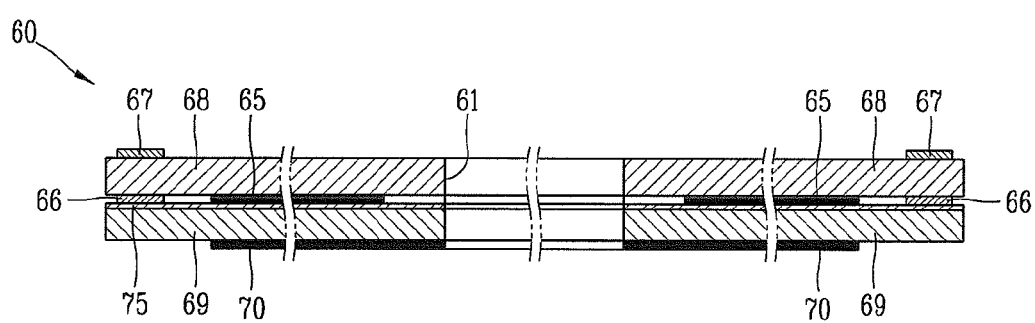
FIG. 5 is a sectional view taken along line V-V in FIG. 4.
Figure 6:
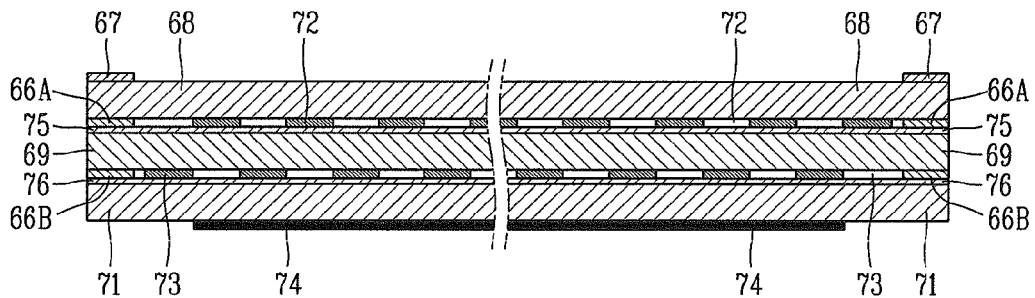
FIG. 6 is a sectional view taken along line VI-VI in FIG. 4.

FIG. 5 is a sectional view taken along line V-V of FIG. 4, and FIG. 6 is a sectional view taken along line VI-VI of FIG. 4.

As illustrated in FIGS. 5 and 6, the touch sheet 60 may include transmissive insulation layers 68 and 69 where the touch screen pattern portion 63 and the touch button pattern portion 65 are formed. The transmissive insulation layers 68 and 69 may be formed of polyethylene film (or other appropriate materials) and several sheets of polyethylene films may be stacked to form the transmissive insulation layers 68 and 69.

With reference to FIG. 5, the second region 50 of the touch sheet 60 may include the first transmissive insulation layer 68 with the touch button pattern portion 65 formed on an inner surface thereof, and the second transmissive insulation layer 69 formed at a lower side of the first transmissive insulation layer 68 and including a conductive film 70. The first transmissive insulation layer 68 and the second transmissive insulation layer 69 may be attached by an adhesive layer 75, 76 (or some other appropriate means). The conductive film 70 formed on the second transmissive insulation layer 69 may serve to block or minimize the influence of electric fields caused by internal components.

The touch button pattern portion 65 may be made of a transmissive or translucent material to allow light emitted from the illumination unit 53 to pass therethrough. The touch screen pattern portion 63 and the touch button pattern portion 65 may be made of ITO (Indium Tin Oxide) through a sputtering process.

A shielding line 67 for shielding the data line 66 of the touch screen pattern portion 63 may be formed on edges of the first transmissive insulation layer 68. The shielding line 67 may extend to the first region 40 to shield the data line 66 of the touch screen pattern portion 63 (See FIGS. 4 and 5).

With reference to FIG. 4, the shielding line 67 may partition the first region 40 where the touch screen pattern portion 63 is formed and the second region 50 where the touch button pattern portion 65 are formed. Unlike the touch screen pattern portion 63 and the touch button pattern portion 65, the data line 66 or the shielding line 67 of the touch screen pattern portion 63 may be configured by printing a copper foil or a conductive metal to thus reduce fabrication costs.

Configuring the touch screen pattern portion 63 and the touch button pattern portion 65 together on the touch sheet 60 has the following advantages. Namely, if the touch sheet had only the touch screen pattern and through holes were formed on the touch sheet to dispose the means such as the push buttons, because the touch screen pattern has the grid (lattice) (See FIG. 4) or matrix form, many problems would arise: for example, it would be difficult to detect a touch applied to the touch screen pattern, and additional complicated technical considerations should be taken to compensate for a distorted signal to extract a proper signal. Thus, by disposing both the touch screen pattern portion 63 and the touch button pattern part 65 on the touch sheet 60, such problems can be minimized.

With reference to FIG. 5, the shielding line 67 may be positioned on the opposite surface of the first transmissive insulation layer 68 where the data line 66 of the touch screen pattern portion 63 is disposed, to thereby reduce the area required by the shielding line 67 and enhancing shielding effects.

The shielding line 67 may be electrically short-circuited with ground of the illumination unit 53 in order to prevent or minimize the touch screen pattern portion 63 that sense a fine touch from being affected by the illumination unit 53 that may cause erroneous operations.

As shown in FIG. 6, the touch screen pattern portion 63 may be configured by combining a horizontal pattern part 63A and a vertical pattern part 63B, and may include a transmissive insulation layer 68A with the horizontal pattern part 63A formed thereon, a transmissive insulation layer 68B with the vertical pattern part 63B formed thereon, and a transmissive insulation layer 68 with the conductive film 70 formed thereon. Accordingly, a user touch applied to the first region 40 of the window 13 may be sensed according to a change in capacitance (or other parameter, characteristics, etc.) of the horizontal pattern part 63A and the vertical pattern part 63B, and an input operation corresponding to the touched position is performed according to a combination of the corresponding positions of the horizontal pattern part 63A and the vertical pattern part 63B.

The horizontal pattern part 63A and the vertical pattern part 63B may be interchanged in their positions. In addition, the horizontal pattern part 63A and the vertical pattern part 63B may be made of ITO (Indium Tin Oxide) through sputtering in the same manner as that of the touch button pattern part 65.

Referring to Figures, the features of the present invention may also be summed up as follows.

A touch sensitive member is comprised of an integrated sheet 60 having a planar surface divided into a first section 40 and a second section 50 respectively used to receive different types of user touch inputs; an array of touch sensors 63 at the first section that senses user touch inputs using a first pattern of touch sensitive elements; and a plurality of touch activated regions 65 at the second section that senses user touch inputs using a second pattern of touch sensitive elements.

The touch sensitive elements detect user touch inputs based on changes in at least one of capacitance, resistance, pressed duration, and pressure. The touch sensitive member further comprises a data line structure 66,67 formed along the edges of the integrated sheet 60 to provide electrical connections for the touch sensors 63, and allow the touch sensors 63 and the touch activated regions 65 to be electrically connected with a circuit board at an end portion of the integrated sheet. The second section comprises at least one opening 61,62 formed adjacent to the touch activated regions 65 to accommodate push buttons that are implemented together with the integrated sheet. The integrated sheet comprises a plurality of transmissive insulation layers 68,69,71 stacked together with the touch sensors and touch activated regions 65,72,73 located at certain portions therebetween. The integrated sheet further comprises a conductive layer 70,74 formed at a bottom of the lowermost transmissive layer that minimizes electrical field interference from other electrical components located under the integrated sheet. The transmissive insulation layers are attached together using an adhesive means 75,76. The elements of the touch sensitive member may be implemented in a mobile terminal 1.

A user interface is comprised of a touch sensitive screen with a planar surface to receive user inputs and to display information; and at least one mechanical button implemented at a non-edge portion in the planar surface of the touch sensitive screen, wherein the touch sensitive screen has a first section with a first pattern of touch sensors and a second section with a second pattern of touch sensors.

The touch sensitive screen comprises: a touch matrix at the first section to form the first pattern of touch sensors; and a plurality of touch activated regions at the second section around the mechanical button to form the second pattern of touch sensors. The touch matrix and the touch activated regions detect user touch inputs according to changes in at least one of capacitance, resistance, pressed duration, and pressure.

Figure 7:
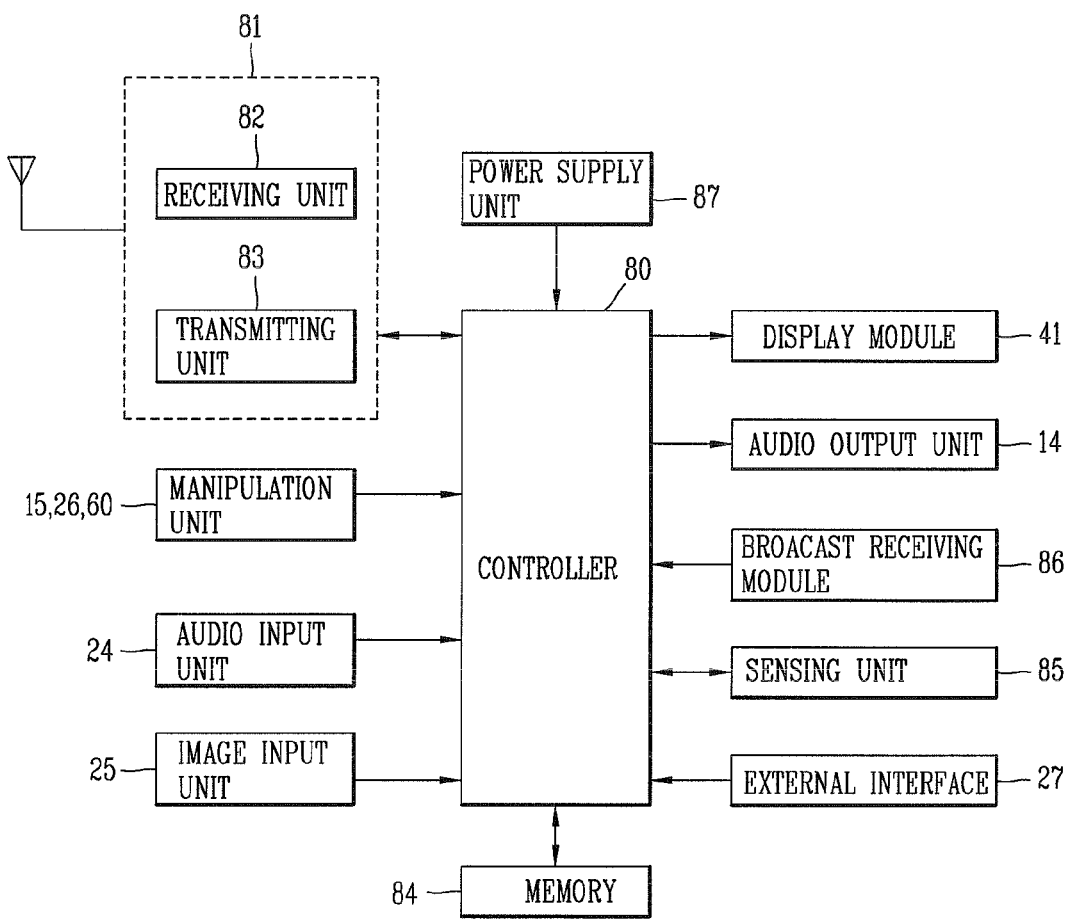
FIG. 7 is a schematic block diagram showing an exemplary configuration of the mobile terminal related to the present invention.

FIG. 7 is a schematic block diagram showing an exemplary configuration of the mobile terminal related to the present invention.

The mobile terminal according to an embodiment of the present invention may include a mobile communication module 81, manipulation units 15, 26, and 60, the image input units 16 and 25, the audio input unit 24, the display module 41, the audio output unit 14, the external interface 27, a broadcast receiving module 86, a memory 84, a power supply unit 87, a controller 80, and the like.

The manipulation units 15, 26, and 60 may be configured as shown in FIGS. 1 to 4 and receive commands (instructions) inputted by the user to control operations of the terminal according to the controller 80.

The controller 80 typically controls the general operations of the mobile terminal. For example, the controller 180 performs the controlling and processing associated with voice calls, data communications, video calls, and the like. Besides controlling such general functions, the controller may receive a touch signal transferred from the touch sheet 60 and execute a control command according to the input touch signal.

The mobile communication module 81 may transmit/receive radio signals to/from a network (e.g., mobile communication base station) via an antenna. For example, the mobile communication module 81 may include a transmitting unit 83 that handles the transmission and reception of audio data, text data, image data and control data, modulates transmission signals and transmits the modulated signal, and a receiving unit 82 that demodulates received signals under the control of the controller 80.

The image input units 16 and 25 may be implemented as a camera module (or other type of image capture unit) that captures an image or video of the user or other objects. When the image input units 16 and 25 are used, namely, when the image input units 16 and 25 are operating in an image capturing mode or a video capturing mode, the display module 41 displays marks (or indications) for controlling various functions of the image input units 16 and 25 under the control of the controller 80.

The image input units 16 and 25 may process image frames such as still images or video acquired by an image sensor or the like. The processed image frames may be converted into image data that can be displayed on the display module 41 and then outputted to the display module 41. The image frames processed by the image input units 16 and 25 may be stored in the memory 84 or transmitted externally through the mobile communication module 81 under the control of the controller 80.

The audio input unit 24 may receive external audio signals via a microphone in a phone call mode, a recording mode or a voice recognition mode, etc., and process the received audio signals into electrical voice data. In the phone call mode, the processed voice data is converted into a form that can be transmitted to the network (e.g., mobile communication base station) via the mobile communication module 81. In the recording mode, the processed voice data is outputted to be stored in the memory 84.

The audio input unit 24 may include various types of noise canceling (or suppression) algorithms to cancel (or suppress) noise generated in the course of receiving and transmitting audio signals.

The display module 41 may output information processed in the mobile terminal. For example, when the mobile terminal 100 is in the phone call mode, the display module 41 may display a User Interface (UI) or a Graphic User Interface (GUI) associated with a call or other communication under the control of the controller 80. When the mobile terminal 100 is in the video call mode or the image capturing mode, the display module 41 may display a captured image and/or received image, a UI, a GUI, and the like, under the control of the controller 80.

The content outputted by the display module 41 may be an item or a list that can be selected by the user via the touch screen pattern part 63 of the touch sheet 60.

The audio output unit 14 may convert audio data received from the mobile communication module 81 or stored in the memory 84 and output the converted data in a call signal reception mode, a phone call mode, a recording mode, a voice recognition mode, and the like, under the control of the controller 80. Also, the audio output module 14 may provide audible outputs related to a particular function (e.g., a call signal reception sound, a message reception sound, etc.) performed by the mobile terminal. The audio output module 152 may include a speaker, a receiver, a buzzer, or the like.

The external interface 27 may serve as an interface with at least one external device connected with the mobile terminal. For example, the external devices may include wired/wireless headsets, external power chargers, wired/wireless data ports, card sockets (e.g., for receiving a memory card, a Subscriber Identity Module/User Identity Module (SIM/UIM) card, etc.), audio input/output (I/O) ports, video I/O ports, earphones, microphones, and the like. The external interface 27 may be used to receive inputs (e.g., data, information, power, etc.) from an external device and transfer the received inputs to one or more elements within the mobile terminal, or may be used to transfer data from the mobile terminal to another external device.

The memory 84 may store programs or the like used for the processing and controlling performed by the controller 80, or may temporarily store inputted/outputted data (e.g., a phonebook, messages, still images, video, etc.). The memory 84 may include at least one type of storage medium including a hard disk type, a card-type memory (e.g., SD or XD memory, etc), a flash memory, a Random Access Memory (RAM), a Read-Only Memory (ROM), and the like.

The sensing unit 85 detects a current status (or state) of the mobile terminal such as an open/close state of the mobile terminal, a location of the mobile terminal, presence or absence of user contact with the mobile terminal, etc., and generates a sense (control) signal for controlling the operation of the mobile terminal. For example, when the mobile terminal is a slide type mobile phone, the sensing unit 85 may sense whether the slide phone is opened or closed and output the sensing result to the controller 80 to control the operation of the terminal. In addition, the sensing unit 140 can detect whether or not the power supply unit 87 supplies power or whether or not the external interface 27 is coupled with an external device.

The broadcast receiving module 86 may receive a broadcast signal transmitted through a satellite or terrestrial means, convert the same into a broadcast data format that can be outputted to the display module 41, and output the converted data to the controller 80. In addition, the broadcast receiving module 86 may receive supplementary data associated to a broadcast (e.g., Electronic Program Guide (EPG), a channel list, etc.). The broadcast data and supplementary data converted by the broadcast receiving module 86 may be stored in the memory 84.

The mobile terminal according to an embodiment of the present invention is advantageous in that the touch screen and the touch buttons can be implemented as a single touch sheet.

In particular, because the touch button pattern part formed at the second region have a certain limited area (region), additional components (or elements) such as a through hole may be included at a portion thereof, unlike the touch screen pattern part.

Because a push-type key (or button) that can provide a click sensation to the user may be mounted at the through hole, the usability can be enhanced.

In addition, because the front surface of the terminal body allows inputs in a touch manner, high capacity and high density multimedia or communication information can be easily and quickly accessed or executed and also generation of complicated border lines can be reduced, improving the external appearance.

The embodiments of the mobile terminal as described above are not to be limited in their configurations and methods, and all or some of the embodiments may be selectively combined into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal, comprising:
    a body;
    a display located at an interior side of the body, the display being configured to display information;
    a mechanical input button configured to be manipulated in response to an applied force;
    a single window configured to be coupled to the body, wherein the single window comprises a first region and a second region, wherein the first region is optically transmissive and generally aligned with the display to permit viewing of the information displayed by the display, and wherein the single window is shaped to define an aperture that is sized to permit the mechanical input button to pass through;
    touch input keys located on the second region of the window and configured to sense a touch applied thereto, wherein the aperture of the single window is positioned between the touch input keys; and
    a touch sheet including a touch screen pattern region and a touch button pattern region, and configured to sense a touch applied to the single window and to generate a signal according to the sensed touch, wherein the touch button pattern region is shaped to define an aperture that is sized to permit the mechanical input button to pass through, wherein the second region includes symbols, wherein the second region, other than where the symbols are located, is substantially opaque, wherein each symbol of the symbols corresponds to a respective key of the touch input keys, wherein the touch screen pattern region is below the first region of the single window to permit sensing of a touch applied to the first region of the single window, wherein the touch button pattern region is below the second region, wherein the touch button pattern region includes first and second portions which are each aligned with at least one of the touch input keys such that the first and second portions are configured to sense touches applied to the touch input keys, wherein the first and second portions are respectively disposed at left and right sides of the mechanical input button.

2. The mobile terminal of claim 1, wherein the symbols are disposed on a surface of the single window that faces toward the interior side of the body.

3. The mobile terminal of claim 1, wherein:

the symbols are substantially hidden during a standby state of the mobile terminal and illuminated by light from one or more light sources when an input is applied to the mobile terminal; and the one or more light sources are located proximate to the touch input keys.

4. The mobile terminal of claim 3, wherein the one or more light sources provide light to the touch input keys.

5. The mobile terminal of claim 1, further comprising a camera located at the interior side of the body, wherein the single window further comprises a third region, wherein the third region includes a region of the single window other than the first and second regions, the third region comprising an opaque area and a light transmissive area which is aligned with the camera, wherein the body further comprises a case having a member located between the single window and the camera, and wherein the member is shaped to define an aperture that is generally aligned with the third region of the single window and the camera.

6. The mobile terminal of claim 1, further comprising a printed circuit board (PCB) and at least one flexible PCB, wherein each of the first and second portions is connected with the at least one flexible PCB and the at least one flexible PCB is connected with the PCB, and wherein at least part of the mechanical input button is installed at the PCB.

7. The mobile terminal of claim 6, wherein the PCB is disposed at the second region.

8. The mobile terminal of claim 7, wherein the touch button pattern region is positioned to overlap the PCB.

9. The mobile terminal of claim 6, further comprising at least one illumination unit provided at the PCB such that the touch input keys are illuminated by light generated from the at least one illumination unit.

10. A mobile terminal, comprising:

a body;

a display located at an interior side of the body, the display being configured to display information;

a single window configured to be coupled to the body, wherein the single window comprises a first region and a second region, wherein the first region is optically transmissive and aligned with the display to permit viewing of the information displayed by the display;

a mechanical input button configured to be manipulated in response to an applied force;

a first touch sensing portion aligned to cooperate with the first region and configured to sense a touch applied to the first region;

a second touch sensing portion including a plurality of parts which are individually aligned with one symbol of a plurality of symbols such that each of the plurality of parts is configured to sense touches applied to the symbols, wherein the second region of the single window, other than where the plurality of symbols are located, is substantially opaque; and at least one light source configured to illuminate the symbols, wherein the single window is shaped to define an aperture that is sized to permit the mechanical input button to pass through, wherein the aperture of the single window is positioned between the plurality of symbols;

wherein the first touch sensing portion and the second touch sensing portion are included in a touch sheet capable of sensing a touch applied to the single window, wherein the plurality of parts are spaced apart from each other, and wherein the second touch sensing portion is shaped to define an aperture that is sized to permit the mechanical input button to pass through such that the mechanical input button is disposed between the plurality of parts.

11. The mobile terminal of claim 10, wherein each of the plurality of symbols is located on a surface of the single window that faces toward the interior side of the body.

12. The mobile terminal of claim 10, wherein the display and the at least one light source are located underneath the single window.

13. The mobile terminal of claim 10, wherein the at least one light source is located proximate to the plurality of parts.

14. The mobile terminal of claim 13, wherein the at least one light source provides light to illuminate all of the symbols.

15. The mobile terminal of claim 10, wherein the mechanical input button is operatively coupled to the interior side of the body and located in the second region; and wherein the mechanical input button is physically separated from the display and includes an exposed top surface to permit user contact.

16. The mobile terminal of claim 10, further comprising a camera located at the interior side of the body, wherein the single window further comprises a third region, wherein the third region includes a region of the window that remains after the first and second regions, the third region comprising an opaque area and a light transmissive area that is aligned with the camera, wherein the body further comprises a case having a member located between the single window and the camera, and wherein the member is shaped to define an aperture that is generally aligned with the third region of the single window and the camera.

\* \* \* \* \*